US012640302B2

(12) United States Patent
Yuan et al.

(10) Patent No.: US 12,640,302 B2
(45) Date of Patent: May 26, 2026

(54) PLANAR LITZ COIL FOR WIRELESS POWER TRANSFER

(71) Applicant: Renesas Electronics America Inc., Milpitas, CA (US)

(72) Inventors: Sheng Yuan, Shanghai (CN);
Shangfeng Jiang, Chengdu (CN);
Weiwei Zhou, Chengdu (CN);
Jiangjian Huang, Milpitas, CA (US);
Bo Tang, Chengdu (CN)

(73) Assignee: Renesas Electronics America Inc., Milpitas, CA (US)

( * ) Notice: Subject to any disclaimer, the term of this patent is extended or adjusted under 35 U.S.C. 154(b) by 739 days.

(21) Appl. No.: 18/043,468

(22) PCT Filed: Feb. 3, 2023

(86) PCT No.: PCT/CN2023/074433
§ 371 (c)(1),
(2) Date: Feb. 28, 2023

(87) PCT Pub. No.: WO2024/159530
PCT Pub. Date: Aug. 8, 2024

(65) Prior Publication Data
US 2025/0087404 A1     Mar. 13, 2025

(51) Int. Cl.
H01F 27/28 (2006.01)
H01F 41/04 (2006.01)
H02J 50/10 (2016.01)

(52) U.S. Cl.
CPC ....... H01F 27/2804 (2013.01); H01F 41/041 (2013.01); H02J 50/10 (2016.02)

(58) Field of Classification Search
CPC ..... H01F 27/2804; H01F 41/041; H02J 50/10
See application file for complete search history.

(56) References Cited

U.S. PATENT DOCUMENTS 6,087,583 A * 7/2000 Runge ................... H01F 27/323
174/15.1
2014/0085031 A1* 3/2014 Nomura ................. H01F 41/00
336/200

(Continued)

FOREIGN PATENT DOCUMENTS

CN     106208408 A     12/2016
CN     109036803 A * 12/2018     ......... H01F 27/2871
(Continued)

OTHER PUBLICATIONS

International Preliminary Report on Patentability Chapter I, China Nat'l Intellectual Property Admin 2024 (Year: 2024).*

(Continued)

*Primary Examiner* — Malcolm Barnes
(74) *Attorney, Agent, or Firm* — SCULLY, SCOTT, MURPHY & PRESSER, P.C.

(57) ABSTRACT

Structures, devices, and methods for wireless power transfer systems are described. A structure can include a plurality of strands arranged into a first coil layer and a second coil layer. The plurality of strands can be formed on a parallel path surrounding a center of the structure. The plurality of strands can extend away from the center on the first coil layer. The plurality of strands can extend towards the center on the second coil layer. For every fixed interval along a length of the structure, a first strand among the plurality of strands can be looped from the first coil layer to the second coil layer and a second strand among the plurality of strands can be looped from the second coil layer to the first coil layer.

20 Claims, 10 Drawing Sheets

(56)                    References Cited

U.S. PATENT DOCUMENTS

2021/0193381  A1 *    6/2021   Costinett .............  H01F 27/2804
2024/0234008  A1 *    7/2024   Stein .......................  H02J 50/10
2024/0282511  A1 *    8/2024   Huang .................  H01F 27/323

FOREIGN PATENT DOCUMENTS

CN          109461571  A    *   3/2019   .........  H01F 27/2823
CN          210156236  U        3/2020
WO          2022265877 A1      12/2022

OTHER PUBLICATIONS

International Search Report and Written Opinion dated Oct. 13, 2023 received in PCT Patent Application No. PCT/CN2023/074433.

* cited by examiner

140

142

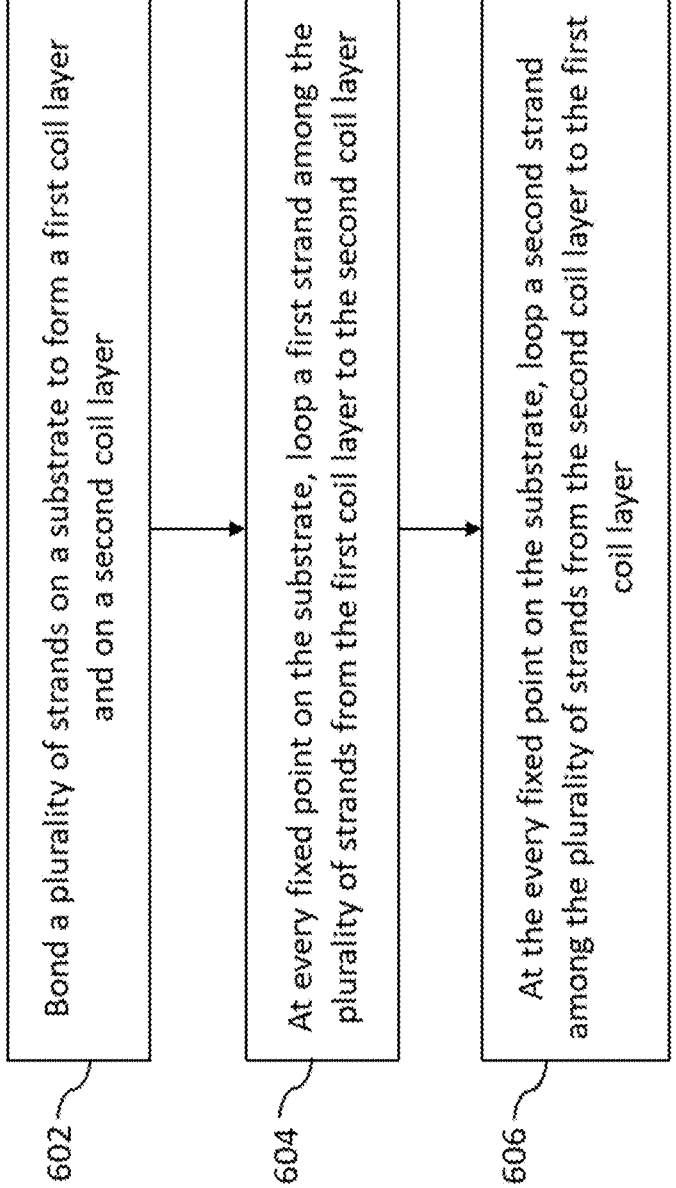

600

602 — Bond a plurality of strands on a substrate to form a first coil layer and on a second coil layer 604 — At every fixed point on the substrate, loop a first strand among the plurality of strands from the first coil layer to the second coil layer 606 — At the every fixed point on the substrate, loop a second strand among the plurality of strands from the second coil layer to the first coil layer

Fig. 6

PLANAR LITZ COIL FOR WIRELESS POWER TRANSFER

CROSS-REFERENCE TO RELATED APPLICATION

This application is a national phase entry of PCT International Application No. PCT/CN2023/074433, filed on Feb. 3, 2023. The disclosure of PCT International Application No. PCT/CN/2023/074433 is incorporated by reference herein.

BACKGROUND

The present disclosure relates in general to apparatuses and devices including a planar Litz coil configuration.

Wireless power system can include a transmitter having a transmission coil and a receiver having a receiver coil. The transmission coil and the receiver coil can be brought close to one another to form a transformer that can facilitate inductive transmission of alternating current (AC) power. The transfer of AC power, from the transmitter to the receiver, can facilitate charging of a battery of the device including the receiver.

SUMMARY

In one embodiment, a structure is generally described. A structure can include a plurality of strands arranged into a first coil layer and a second coil layer. The plurality of strands can be formed on a parallel path surrounding a center of the structure. The plurality of strands can extend away from the center on the first coil layer. The plurality of strands can extend towards the center on the second coil layer. For every fixed interval along a length of the structure, a first strand among the plurality of strands can be looped from the first coil layer to the second coil layer and a second strand among the plurality of strands can be looped from the second coil layer to the first coil layer.

In one embodiment, a device is generally described. The device can include a power rectifier configured to rectify alternating current (AC) power into direct current (DC) power. The device can further include a controller connected to the power rectifier. The controller can be configured to control the power rectifier. The device can further include a structure configured to receive the AC power. The structure can include a plurality of strands arranged into a first coil layer and a second coil layer. The plurality of strands can be formed on a parallel path surrounding a center of a structure. The plurality of strands can extend away from the center on the first coil layer. The plurality of strands can extend towards the center on the second coil layer. For every fixed interval along a length of the structure, a first strand among the plurality of strands can be looped from the first coil layer to the second coil layer and a second strand among the plurality of strands can be looped from the second coil layer to the first coil layer.

In one embodiment, a method for constructing a coil of a device is generally described. The method can include bonding a plurality of strands on a substrate to form a first coil layer and on a second coil layer. The plurality of strands can extend away from the center on the first coil layer and extend towards the center on the second coil layer. At every fixed point on the substrate, the method can include looping a first strand among the plurality of strands from the first coil layer to the second coil layer and looping a second strand among the plurality of strands from the second coil layer to the first coil layer.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 is a flow diagram illustrating a process of constructing planar Litz coil for wireless power transfer in one embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
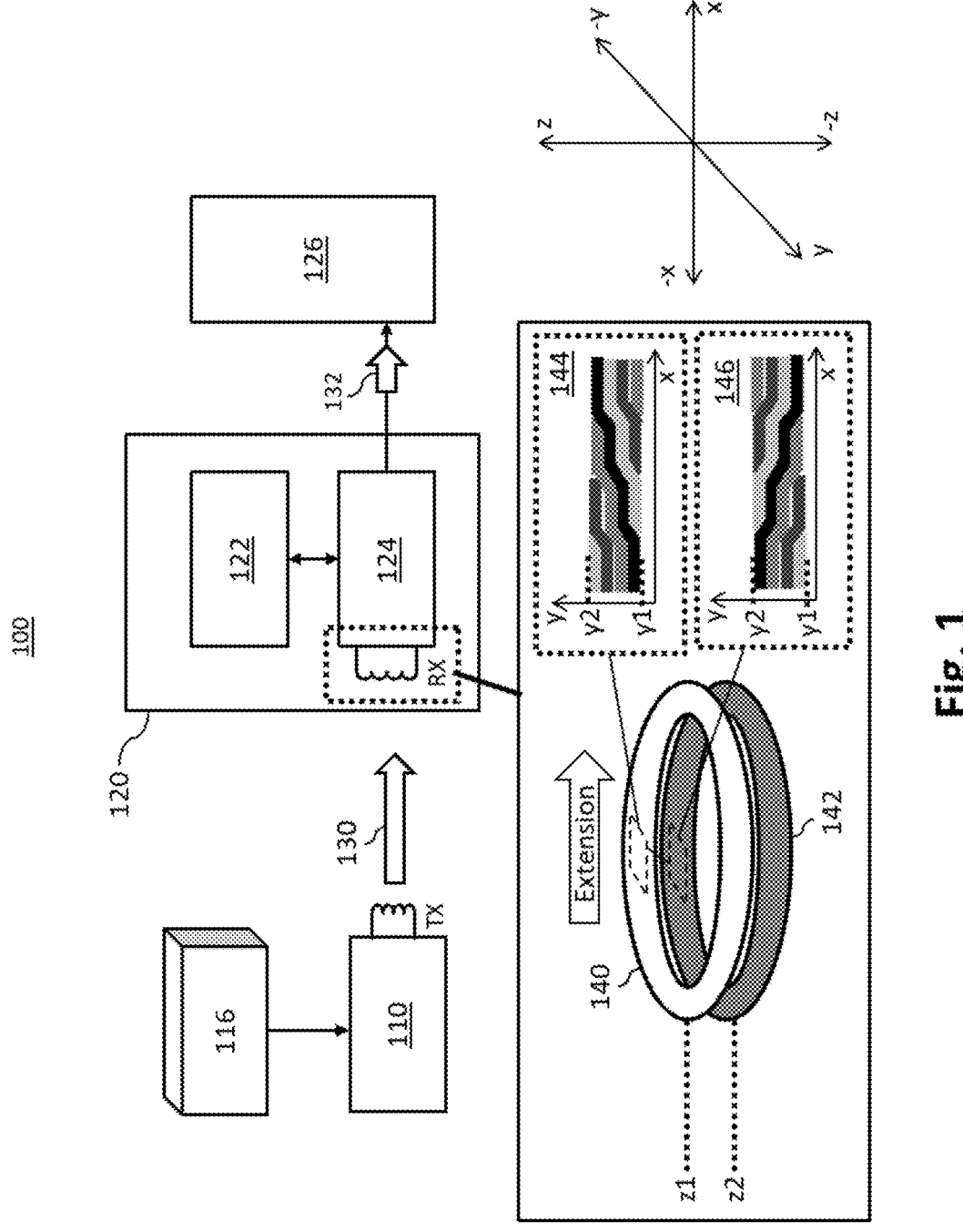
FIG. 1 is a block diagram of an example system for wireless power transfer according to an embodiment.

FIG. 1 is a block diagram of an example system 100 for wireless power transfer according to an embodiment. System 100 can include a transmitter 110 and a receiver 120 that are configured to wirelessly transfer power and data therebetween via inductive coupling. While described herein as transmitter 110 and receiver 120, each of transmitter 110 and receiver 120 may be configured to both transmit and receive power or data therebetween via inductive coupling.

Transmitter 110 is configured to receive power from one or more power supplies and to transmit AC power 130 to receiver 120 wirelessly. For example, transmitter 110 may be configured for connection to a power supply 116 such as, e.g., an adapter or a DC power supply. Transmitter 110 can include a coil TX, and can drive the coil TX to produce a magnetic field. Transmitter 110 can be configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 can be configured to receive AC power 130 transmitted from transmitter 110 and to supply the power to one or more loads 126 or other components of a destination device. Load 126 may comprise, for example, a battery charger that is configured to charge a battery of a destination device, such as a computing device, mobile device, mobile telephone, smart device, tablet, wearable device or any other electronic device that is configured to receive power wirelessly. In an embodiment, the destination device can include receiver 120. In other embodiments, receiver 120 may be separate from the destination device and connected to the destination device via a wire or other component that is configured to provide power to destination device.

Receiver 120 can include a controller 122 and a power rectifier 124. Controller 122 can include, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. Power rectifier 124 is configured to rectify AC power received from coil RX into DC power 132 which may then be supplied to load 126.

As an example, when receiver 120 is placed in proximity to transmitter 110, the magnetic field produced by coil TX induces a current in coil RX of power rectifier 124. The induced current causes AC power 130 to be inductively transmitted from transmitter 110 to power rectifier 124. Power rectifier 124 receives AC power 130 and converts AC power 130 into DC power 132. DC power 132 is then provided by power rectifier 124 to load 126.

Transmitter 110 and receiver 120 are also configured to exchange information or data, e.g., messages, via the inductive coupling of the power driver of transmitter 110 and power rectifier 124. For example, before transmitter 110 begins transferring power to receiver 120, a power contract may be agreed upon and created between receiver 120 and transmitter 110. In another example, in response to receiver 120 being brought in proximity to transmitter 110, e.g., close enough such that a transformer may be formed by coil TX and coil RX to allow power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place. Transmitter 110 and receiver 120 may transmit and receive communication packets, data or other information via the inductive coupling of coil TX and coil RX. In some embodiments, communication between transmitter 110 and receiver 120 can occur before power transfer stage using various protocols such as near field communication (NFC), Bluetooth, etc.

In an aspect, a receiver coil of a wireless power receiver can be constructed using multistrand wires (e.g., Litz wires, or wire including multiple strands). Utilization of multistrand wires can reduce skin depth effect, where skin depth effect is a tendency for alternating electric current (AC) to be displaced from the center of a wire to its surface. The plurality of strands can have different lengths due to the shape of the receiver coil. For example, if the receiver coil includes two strands of wires, such as an inner strand and an outer strand, that are arranged in parallel paths around a center to form a loop (e.g., circular loop, rectangular loop, or other loop shapes), then the inner strand (e.g., strand closer to the center) will be shorter in length, than the outer strand (e.g., strand further from the center). The difference in length can cause the plurality of strands to experience different magnetic flux created by the alternating current created from AC power being received by the receiver coil. For example, the outer strand can experience more magnetic flux than the inner strand due to the outer strand occupying more area of the receiver coil (e.g., longer length). The difference in magnetic flux being experienced by the different size (e.g., different length) strands can cause loop current to be induced between the strands, and this induced loop current can be converted to heat, thus increasing a temperature of the receiver.

A receiver coil configuration for reducing skin depth effect and loop current is shown in FIG. 1. The coil RX of receiver 120 can include a plurality of strands (e.g., coils or wires) arranged into at least a first coil layer 140 ("first layer 140") and a second coil layer 142 ("second layer 142"). In one embodiment, first layer 140 can be arranged on a first plane z1 and second layer 142 can be arranged on a second plane z2, where first plane z1 and second plane z2 are parallel two-dimensional planes on a x-y plane. First layer 140 and second layer 142 can be adjacent to one another in a direction (e.g., z-direction, or vertical direction) perpendicular to the first plane z1 and the second plane z2 (and perpendicular to a horizontal or lateral plane, such as the x-y plane).

The plurality of strands in coil RX can be flexible printed coils (FPC). The plurality of strands can be arranged into first layer 140 and second layer 140. The plurality of strands can span the widths of the coil RX and alternately loop between first layer 140 and second layer 142 to mimic a twisting of strands of coils (e.g., mimicking a coil made by Litz wire). By way of example, a portion 144 of first layer 140 and a portion 146 of second layer 142 are shown in FIG. 1. In portion 144, the plurality of strands can be parallel and span laterally (e.g., on the z1 plane) in a lateral direction towards +x and +y (e.g., from y1 to y2). In portion 146, the plurality of strands can be parallel and span laterally (e.g., on the z2 plane) in another lateral direction towards +x and −y (e.g., from y2 to y1). On first layer 140, if a strand reaches an edge such as y2, the strand can loop to the bottom layer, or second layer 142 and begin to span or extend towards y1. When the strand reaches y1 in second layer 142, the strand can loop back to the top layer such as first layer 140 and span or extend towards y2. The repeated spanning and looping between vertical layers can mimic twisting of a Litz wire configuration, and this spanning and looping can allow the plurality of strands forming the coil RX to have equal lengths, thus reducing skin depth effect, proximity effect and loop current. Conventional Litz wires can reduce skin depth effect because its twisting configuration allows wires to have approximately the same length. However, Litz wires can become relatively thick and expensive. The lateral span of the FPCs across the width of coil RX and looping of the FPCs between different vertical layers to mimic a Litz wire can provide a receiver coil that can be constructed to be relatively small and/or thin while reducing skin depth effect and loop current.

Figure 2A:
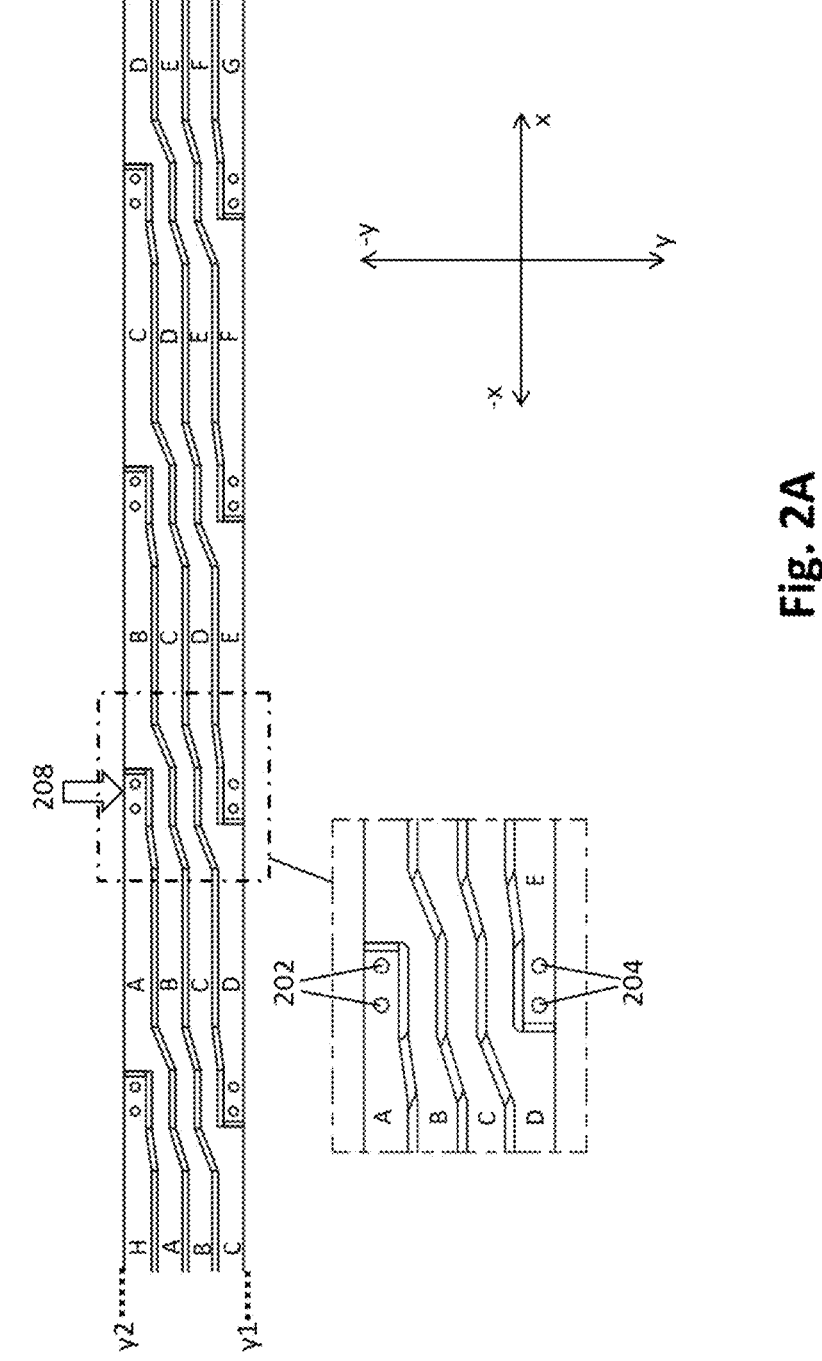
FIG. 2A is a diagram showing components of a receiver that can implement planar Litz coil for wireless power transfer in one embodiment.
Figure 2B:
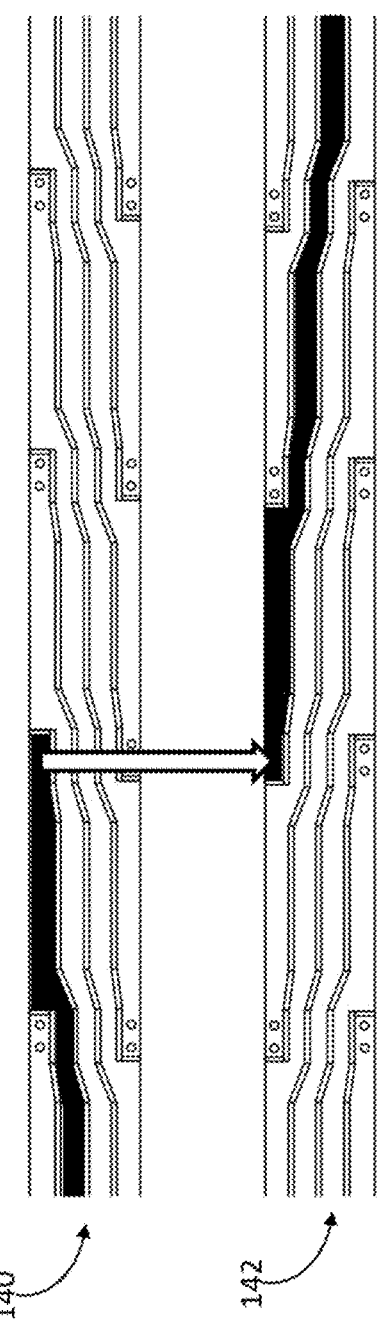
FIG. 2B is another diagram showing components of a receiver that can implement planar Litz coil for wireless power transfer in one embodiment.
Figure 2B:
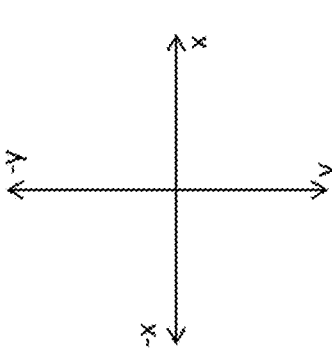
Figure 2C:
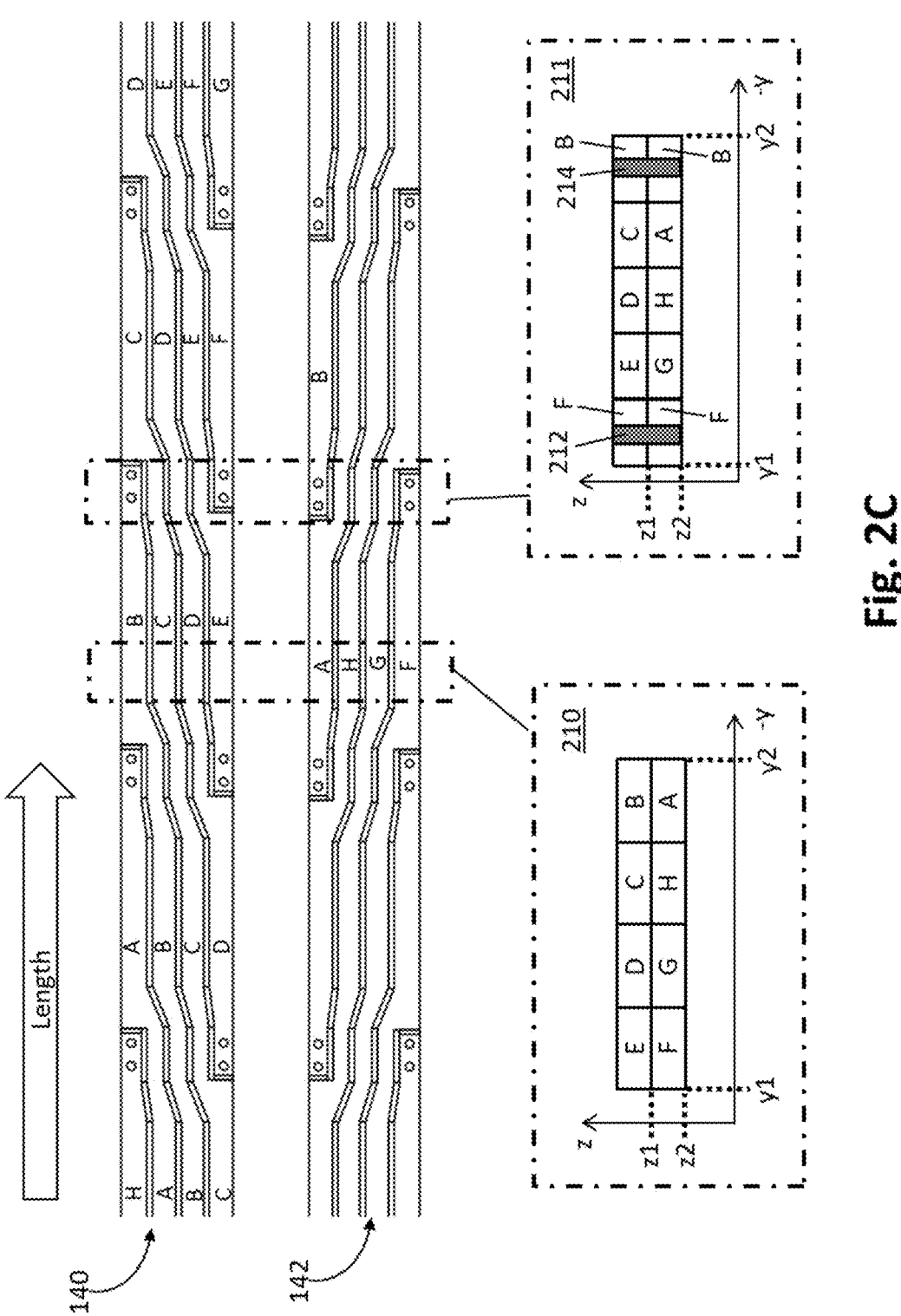
FIG. 2C is another diagram showing components of a receiver that can implement planar Litz coil for wireless power transfer in one embodiment.

FIGS. 2A, 2B, and 2C are diagrams showing components of a receiver that can implement planar Litz coil for wireless power transfer in one embodiment. Portion 144 of first layer 140 (of FIG. 1) is shown in FIG. 2A. In an embodiment shown in FIG. 2A, a plurality of strands A to H (e.g., eight strands) can form the coil RX. Different subset of strands can be parallel at different portions of first layer 140. For example, strands A, B, C, D can be parallel until strand A reaches a fixed point 208 along a length of coil RX and loops to another layer, such as second layer 142 in FIG. 1, through a set of loop hopes 202, as shown in FIG. 2B. Further, as strand A loops to second layer 142, a strand E is looping from second layer 142 into first layer 140 at fixed point 208.

Referring to FIG. 2C, to loop between different layers, each strand can be broken down into different portions and the different portions can overlap at the loop holes such that conductive contacts can be inserted into the overlapped loop holes. In a cross-sectional area 210 shown in FIG. 2C, strands F, G, H, A are parallel on second layer 142 or plane z2, and strands E, D, C, B are parallel on first layer 140 or plane z1. In one embodiment, a layer of substrate, such as a layer of dielectric materials or other types of nonconductive materials, can be positioned between first layer 140 and second layer 142.

As the coil RX progress along a length of coil RX, from cross-sectional area 210 to another cross-sectional area 211, widths of plurality of strands can decrease in order to accommodate the looping of strands from first layer 140 to second layer 142. In the example shown in FIG. 2C, cross-sectional area 211 includes strands F, E, D, C, B on first layer 140 and strands F, G, H, A, B on second layer 142. Strands F and B include different portions on both first layer 140 and second layer 142 and the different portions are portions including loop holes. A conductive contact 212 can connect the different portions of strand F, and a conductive contact 214 can connect the different portions of strand B. Conductive contacts 212, 214 can be, for example, metal vias. After the connection using the loop holes, as the coil RX progress along a length of coil RX, from cross-sectional area 211 to another cross-sectional area, strand F is no longer on second layer 142 and strand B is no longer on first layer 140 (until a next fixed point along the length of coil RX), and widths of the strands can increase once again.

Figure 3A:
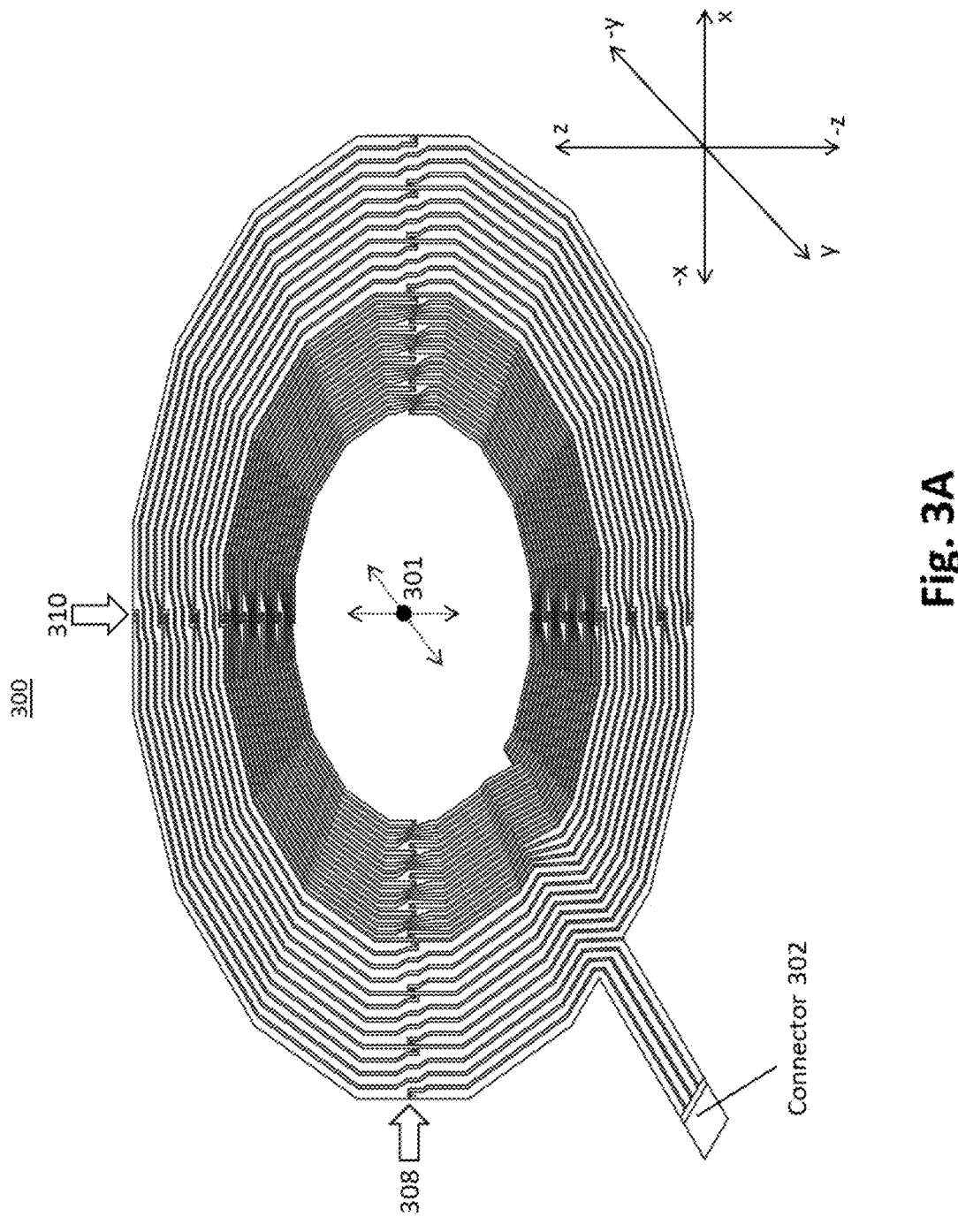
FIG. 3A is a diagram showing a perspective view of an example receiver coil that can implement planar Litz coil for wireless power transfer in one embodiment.

FIG. 3A is a diagram showing a perspective view of an example receiver coil that can implement planar Litz coil for wireless power transfer in one embodiment. A perspective view of a receiver coil 300 is shown in FIG. 3A. Receiver coil 300 can implement coil RX shown in FIG. 1. Receiver coil 300 can be constructed using two layers of coils, such as first layer 140 and second layer 142 described herein. Layers of coils forming receiver coil 300 can be flexible printed circuits (FPCs). Construction of receiver coil 300 using FPCs can allow the receiver coil 300 to have arbitrary shapes and/or sizes. By way of example, receiver coil 300 can have shapes such as circular, rectangular, or other arbitrary shapes. In the example shown in FIG. 3A, receiver coil 300 can form a circular loop around a center 301.

Receiver coil 300 can include eight strands of wires connected at a connector 302. Connector 302 can be a conductive pad composed of conductive materials. At connector 302, four strands of wire can be extended from connector 302 towards first layer 140, and another four strands of wire can be extended from connector 302 towards second layer 142. At fixed points every 90 degrees surrounding center 301, one of the plurality of strands on first layer 140 can loop to second layer 142, and one of the plurality of strands on second layer 142 can loop to first layer 140. For example, at a fixed point 308, an outermost strand (e.g., further away from center 301, see strand A in FIGS. 2A and 2C) among the four strands extended from connector 302 on first layer 140 can loop to second layer 142. Also at fixed point 308, an innermost strand (e.g., closest to center 301, see strand E in 2A and FIG. 2C) among the four strands extended from connector 302 on second layer 142 can loop to first layer 140. After the outermost strand on first layer 140 loop to second layer 142 at fixed point 308, a strand next to the looped outermost strand (e.g., see strand B in 2A and FIG. 2C) can become the outermost strand on first layer 140 until a next fixed point 310. Also, after the innermost strand on second layer 142 loop to first layer 140 at fixed point 308, a strand next to the looped innermost strand (e.g., see strand F in 2A and FIG. 2C) can become the innermost strand on second layer 142 until next fixed point 310.

Figure 3B:
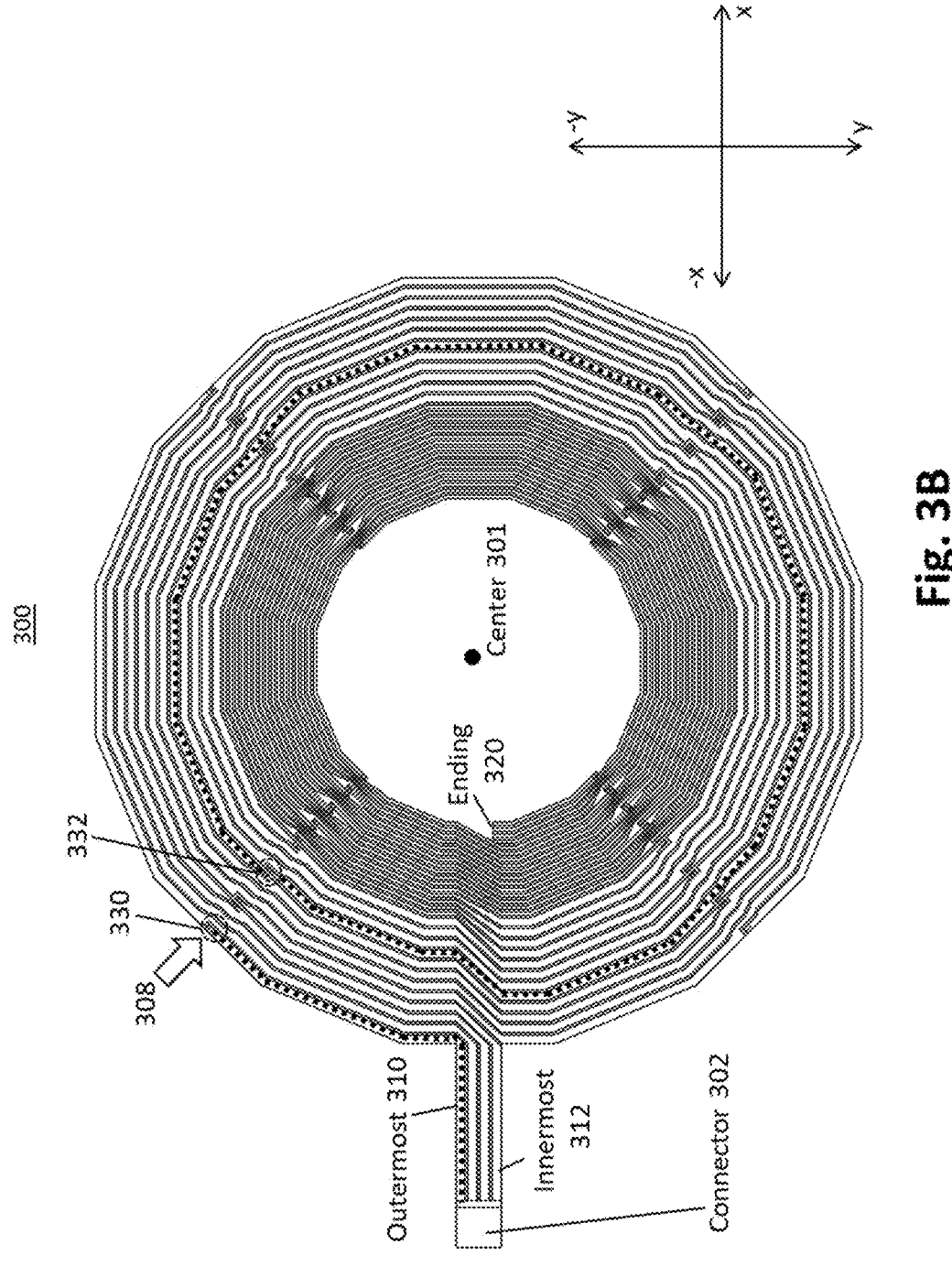
FIG. 3B is a diagram showing a top view of the example receiver coil of FIG. 3A in one embodiment.

FIG. 3B is a diagram showing a top view of the example receiver coil of FIG. 3A in one embodiment. The plurality of strands forming receiver coil 300 can be parallel to one another. An innermost strand 312 ("innermost 312") can be a strand closes to center 301, and an outermost strand 310 ("outermost 310") can be a strand furthest from center 301. Each strand among the plurality of strands can be twisted, or looped to another layer, every 90 degrees around center 301. Further, each strand of wire can span a width in a first lateral direction (e.g., away from center 301) of receiver coil 300 before being twisted, then span in a second direction (e.g., towards center 301) after twisting or looping to another layer. As a result of the repeated spanning across the width of receiver coil 300 in different directions on different layers, and twisting at a fixed interval (e.g., 90-degrees), the plurality of strands can have equal length (or almost equal length) when measured from a starting point at connector 302 to an ending point 320 ("ending 320") of receiver coil 300. The identical length of the plurality of strands can reduce a difference between magnetic flux experienced by the different strands in receiver coil 300, hence reducing loop current. In an aspect, multi-strand coils such as receiver coil 300 can reduce skin depth effect, but having multiple strands of wires with different lengths can increase loop current. Hence, receiver coil 300 (or other receiver coils described herein, such as coil RX in FIG. 1) having multiple strands of wires with identical lengths can reduce skin depth effect and loop current.

As the plurality of strands extend to from receiver coil 300, the plurality of strands can reach the fixed points along the length of the receiver coil 300 multiple times. For example, receiver coil 300 shown in FIG. 3A surrounds center 301 for a total of four times and the fixed points 308, 310 and other fixed points are passed by the plurality of strands four times. Hence, each strand among the plurality of strands can loop between first layer 140 and second layer 142 four times, with two times from first layer 140 to second layer 142 and two times from second layer 142 to first layer 140. As shown by a dotted line in FIG. 3B, the outermost strand 310 can extend from connector 302 and as it reaches fixed point 308, the outermost strand 310 loops to second layer 142 as shown by a highlight 330. The outermost strand 310 can loop around center 301 and reaches fixed point 308 again, as shown by a highlight 332, the outermost strand 310 can loop from second layer 142 to first layer 140 and surround center 301 on first layer 140 again. When the outermost strand 310 reaches fixed point 308 again, as shown by highlight 332, the outermost strand 310 can loop from first layer 140 to second layer 142 again.

Figure 4A:
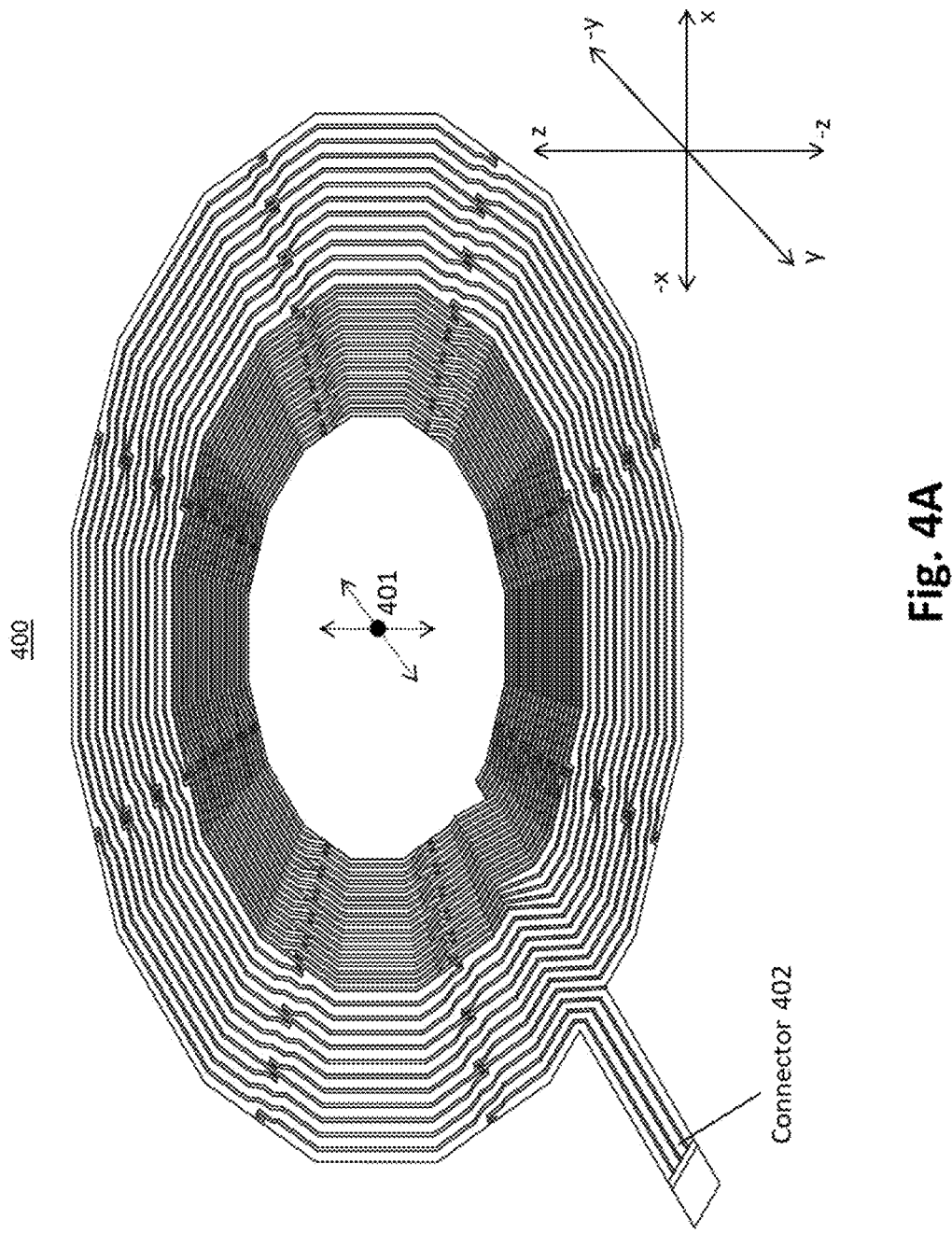
FIG. 4A is a diagram showing a perspective view of an example receiver coil that can implement planar Litz coil for wireless power transfer in one embodiment.

FIG. 4A is a diagram showing a perspective view of an example receiver coil that can implement planar Litz coil for wireless power transfer in one embodiment. A perspective view of a receiver coil 400 is shown in FIG. 4A. Receiver coil 400 can implement coil RX in FIG. 1. Receiver coil 400 can be constructed using two layers of coils, such as first layer 140 and second layer 142 described herein. Layers of coils forming receiver coil 400 can be flexible printed circuits (FPCs). Construction of receiver coil 400 using FPCs can allow the receiver coil 400 to have arbitrary shapes and/or sizes. By way of example, receiver coil 400 can have shapes such as circular, rectangular, or other arbitrary shapes. In the example shown in FIG. 4A, receiver coil 400 can form a circular loop around a center 401.

Receiver coil 400 can include eight strands of wires connected at a connector 402. Connector 402 can be a conductive pad composed of conductive materials. At connector 402, four strands of wire can be extended from connector 402 towards first layer 140, and another four strands of wire can be extended from connector 402 towards second layer 142. At fixed points every 45 degrees surrounding center 401, one of the plurality of strands (e.g., the outermost strand) on first layer 140 can loop to second layer 142, and one of the plurality of strands (e.g., the innermost strand) on second layer 142 can loop to first layer 140.

Figure 4B:
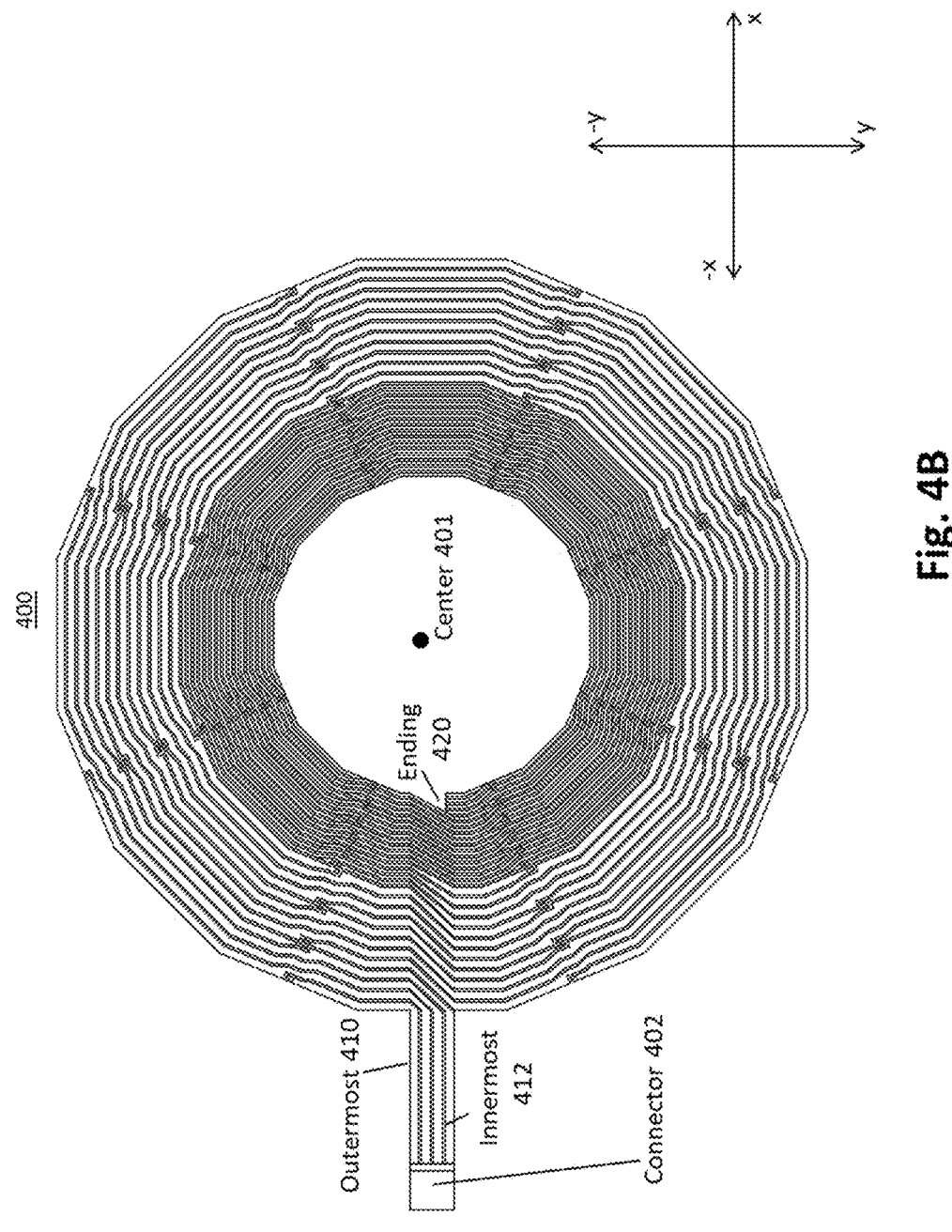
FIG. 4B is a diagram showing a top view of the example receiver coil of FIG. 3A in one embodiment.

FIG. 4B is a diagram showing a top view of the example receiver coil of FIG. 4A in one embodiment. The plurality of strands forming receiver coil 400 can be parallel to one another. An innermost strand 412 ("innermost 412") can be a strand closes to center 401, and an outermost strand 410 ("outermost 410") can be a strand furthest from center 401. Each strand among the plurality of strands can be twisted, or looped to another layer, every 45 degrees around center 401. Further, each strand of wire can span a width in a first lateral direction (e.g., away from center 401) of receiver coil 400 before being twisted, then span in a second direction (e.g., towards center 401) after twisting or looping to another layer. As a result of the repeated spanning across the width of receiver coil 400 in different directions on different layers, and twisting at a fixed interval (e.g., 45-degrees), the plurality of strands can have equal length (or almost equal length) when measured from a starting point at connector 402 to an ending point 420 ("ending 420") of receiver coil 400. The identical length of the plurality of strands can reduce a difference between magnetic flux experienced by the different strands in receiver coil 400, hence reducing loop current. Similar to receiver coil 300 in FIG. 3A, receiver coil 400 having multiple strands of wires with identical lengths can reduce skin depth effect and loop current.

Figure 5:
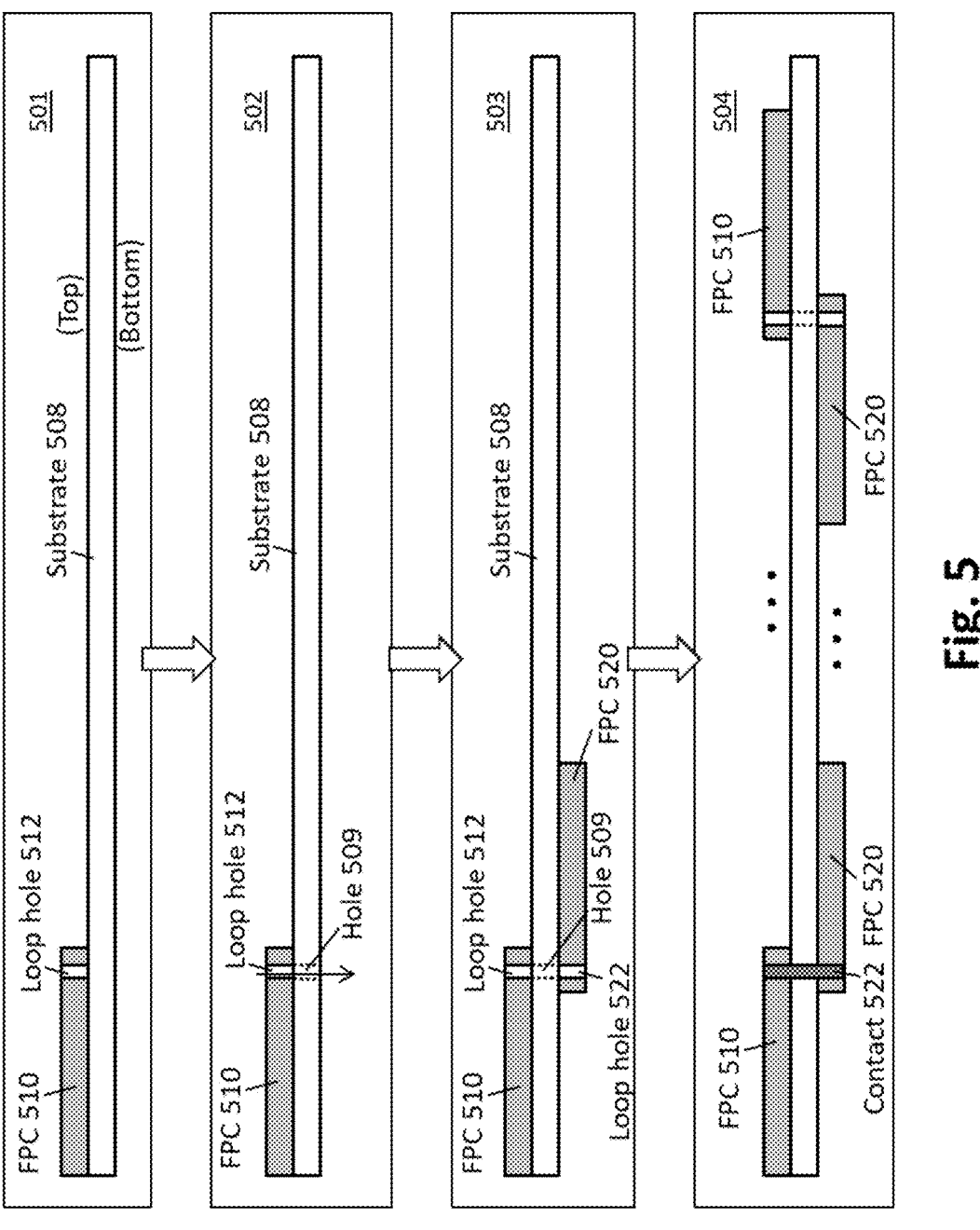
FIG. 5 is a diagram illustrating a series of steps to loop a strand from one layer to another layer in one embodiment.

FIG. 5 is a diagram illustrating a series of steps to loop a strand from one layer to another layer in one embodiment. In a step 501, a FPC 510 can be printed on, or bonded to, a top surface of a substrate 508. FPC 510 can be a metallic layer of trace, such a copper trace, and substrate 508 can be a dielectric layer such as polyimide. In one embodiment, FPC 510 can be relatively thin, such as being less than 0.2-millimeters (0.2 mm). In one embodiment, FPC 510 can be bonded to the top surface of substrate 508 using adhesive materials, or other bonding methods such as vapor deposition, etc. In one embodiment, FPC 510 can be covered with a protective layer such as gold or solder. In one embodiment, FPC 510 can be printed on the top surface of substrate 508 as a pattern. By way of example, photoresist coated panels can be overlayed with patterns of FPC 510 and the overlayed photoresist coated panels can be exposed with collimated ultraviolet (UV) light to transfer the pattern to production panels. The pattern can be chemically etched using specialized thin core handling equipped conveyorized systems. High speed, high precision, small hole capable, drilling systems can be used for creating required hole patterns in the production panels, or laser-based systems can be used for ultra-small hole requirements. In the embodiment shown in FIG. 5, a pattern of FPC 510 can include a set of openings, such as at least one loop hole 512.

Proceeding to a step 502, in response to bonding FPC 510 to the top surface of substrate 508, an opening or hole 509 can be formed on substrate 508. Hole 509 can be formed such as by etching through substrate 508 using the pattern (e.g., loop hole 512) of FPC 510 as an etch mask. Hole 509 can be aligned with loop hole 12 of FPC 510.

Proceeding to a step 503, in response to forming hole 509 in substrate 508, another FPC 520 can be printed on, or bonded to, a bottom surface of substrate 508. FPC 520 can be a metallic layer of trace, such a copper trace, and FPC 520 can be composed of the same materials as FPC 510. In one embodiment, FPC 520 can be relatively thin, such as being less than 2-millimeters (2 mm). In one embodiment, FPC 520 can be bonded to the bottom surface of substrate 508 using adhesive materials, or other bonding methods such as vapor deposition, etc. In one embodiment, FPC 520 can be covered with a protective layer such as gold or solder. In one embodiment, FPC 520 can be printed on the bottom surface of substrate 508 as a pattern using techniques similar to the ones described above for printing FPC 510. In the embodiment shown in FIG. 5, a pattern of FPC 520 can include a set of openings, such as at least one loop hole 522. FPC 520 can be printed on the bottom surface of substrate 508 to align loop hole 522 with hole 509 of substrate 508 and loop hole 512 of FPC 510.

Proceeding to a step 502, in response to bonding FPC 510 to the bottom surface of substrate 508, a contact 522 can be inserted into loop hole 512 of FPC 510, hole 509 of substrate 508, and loop hole 522 of FPC 520. Contact 522 can be, for example, solder bumps, metal bonding pads, and/or other types of conductive or metal contacts. The insertion of contact 522 can connect FPC 510 to FPC 520, and allow current following through FPC 510 to continue flowing through FPC 520. The steps 501 to 504 can be repeated to alternately twist or looped between the top and bottom surfaces of substrate 508 to form a receiver coil, such as the receiver coils shown in FIG. 1 to FIG. 4B described above. Referring to the examples shown in FIG. 1 to FIG. 2B, the top surface of substrate 508 can be where first layer 140 is printed, and the bottom surface of substrate 508 can be w here second layer 142 is printed. Further alignment and lamination process can be performed to package multiple FPCs as a receiver coil.

FIG. 6 is a flow diagram illustrating a process of constructing planar Litz coil for wireless power transfer in one embodiment. The process can include one or more operations, actions, or functions as illustrated by one or more of blocks 602, 604, and/or 606. Although illustrated as discrete blocks, various blocks can be divided into additional blocks, combined into fewer blocks, eliminated, performed in different order, or performed in parallel, depending on the desired implementation.

Process 600 can be performed for constructing a coil of a device, such as a receiver coil of a wireless power receiver. Process 600 can begin at block 602. At block 602, a plurality of strands can be bonded on a substrate to form a first coil layer and on a second coil layer. The plurality of strands can extend away from the center on the first coil layer and can extend towards the center on the second coil layer. In one embodiment, the plurality of strands can be bonded on the substrate by bonding flexible printed coils (FPCs) on the substrate.

Process 600 can proceed from block 602 to block 604 and/or block 606. Block 604 and/or block 606 can be performed at every fixed point on the substrate. At block 604, a first strand among the plurality of strands can be looped from the first coil layer to the second coil layer. At block 606, a second strand among the plurality of strands can be looped from the second coil layer to the first coil layer.

In one embodiment, the first strand can be looped by looping an outermost strand among the plurality of strands from the first coil layer to the second coil layer. The second strand can be looped by looping an innermost strand among the plurality of strands from the second coil layer to the first coil layer. In one embodiment, in response to the first strand being looped from the first coil layer to the second coil layer, a strand adjacent to the first strand can become a new outermost strand among the plurality of strands on the first coil layer. Further, in response to the second strand being looped from the second coil layer to the first coil layer, a strand adjacent to the second strand being looped can become a new innermost strand among the plurality of strands on the second coil layer.

In one embodiment, the first strand can be looped from the first coil layer to the second coil layer by connecting a first portion of the first strand on the first coil layer to a second portion of the first strand on the second coil layer using a first set of contacts. Further, the second strand can be looped from the second coil layer to the first coil layer comprises connecting a first portion of the second strand on the first coil layer to a second portion of the second strand on the second coil layer using a second set of contacts.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A structure comprising:
a plurality of strands arranged into a first coil layer and a second coil layer, wherein:
the plurality of strands are formed on a parallel path surrounding a center of the structure;
the plurality of strands extend away from the center on the first coil layer;
the plurality of strands extend towards the center on the second coil layer; and
for every fixed interval along a length of the structure:
a first strand among the plurality of strands is looped from the first coil layer to the second coil layer; and
a second strand among the plurality of strands is looped from the second coil layer to the first coil layer.

2. The structure of claim 1, wherein the plurality of strands are flexible printed circuit (FPC) coils.

3. The structure of claim 1, wherein the plurality of strands have the same length.

4. The structure of claim 1, wherein:
the first coil layer is arranged on a first plane;
the second coil layer is arranged on a second plane; and
the first coil layer and the second coil layer are adjacent to one another in a direction perpendicular to the first plane and the second plane.

5. The structure of claim 1, wherein the first coil layer and the second coil layer are parts of a wireless power receiver.

6. The structure of claim 1, wherein:
the first strand is an outermost strand among the plurality of strands on the first coil layer; and
the second strand is an innermost strand among the plurality of strands on the second coil layer.

7. The structure of claim 6, wherein:
in response to the first strand being looped from the first coil layer to the second coil layer, a strand adjacent to the first strand becomes a new outermost strand among the plurality of strands on the first coil layer; and
in response to the second strand being looped from the second coil layer to the first coil layer, a strand adjacent to the second strand being looped becomes a new innermost strand among the plurality of strands on the second coil layer.

8. The structure of claim 1, wherein:
the first strand is looped from the first coil layer to the second coil layer by connecting a first portion of the first strand on the first coil layer to a second portion of the first strand on the second coil layer using a first set of contacts; and
the second strand is looped from the second coil layer to the first coil layer by connecting a first portion of the second strand on the first coil layer to a second portion of the second strand on the second coil layer using a second set of contacts.

9. A device comprising:
a power rectifier configured to rectify alternating current (AC) power into direct current (DC) power;
a controller connected to the power rectifier, the controller being configured to control the power rectifier;

a structure configured to receive the AC power, the structure including a plurality of strands arranged into a first coil layer and a second coil layer, wherein:

the plurality of strands are formed on a parallel path surrounding a center of a structure;

the plurality of strands extend away from the center on the first coil layer;

the plurality of strands extend towards the center on the second coil layer; and for every fixed interval along a length of the structure:

a first strand among the plurality of strands is looped from the first coil layer to the second coil layer; and a second strand among the plurality of strands is looped from the second coil layer to the first coil layer.

10. The device of claim 9, wherein the plurality of strands are flexible printed circuit (FPC) coils.

11. The device of claim 9, wherein the controller, the power rectifier and the structure are parts of a wireless power receiver.

12. The device of claim 9, wherein:

the first coil layer is arranged on a first plane;

the second coil layer is arranged on a second plane; and the first coil layer and the second coil layer are adjacent to one another in a direction perpendicular to the first plane and the second plane.

13. The device of claim 9, wherein the plurality of strands have the same length.

14. The device of claim 9, wherein:

the first strand is an outermost strand among the plurality of strands on the first coil layer;

the second strand is an innermost strand among the plurality of strands on the second coil layer;

in response to the first strand being looped from the first coil layer to the second coil layer, a strand adjacent to the first strand becomes a new outermost strand among the plurality of strands on the first coil layer; and in response to the second strand being looped from the second coil layer to the first coil layer, a strand adjacent to the second strand being looped becomes a new innermost strand among the plurality of strands on the second coil layer.

15. The device of claim 14, wherein:

the first strand is looped from the first coil layer to the second coil layer by connecting a first portion of the first strand on the first coil layer to a second portion of the first strand on the second coil layer using a first set of contacts; and the second strand is looped from the second coil layer to the first coil layer by connecting a first portion of the second strand on the first coil layer to a second portion of the second strand on the second coil layer using a second set of contacts.

16. A method for constructing a coil of a device, the method comprising:

bonding a plurality of strands on a substrate to form a first coil layer and on a second coil layer, wherein the plurality of strands extend away from the center on the first coil layer and extend towards the center on the second coil layer;

at every fixed point on the substrate:

looping a first strand among the plurality of strands from the first coil layer to the second coil layer; and looping a second strand among the plurality of strands from the second coil layer to the first coil layer.

17. The method of claim 16, wherein bonding the plurality of strands on the substrate comprises bonding flexible printed coils (FPCs) on the substrate.

18. The method of claim 16, wherein:

looping the first strand comprises looping an outermost strand among the plurality of strands from the first coil layer to the second coil layer; and looping the second strand comprises looping an innermost strand among the plurality of strands from the second coil layer to the first coil layer.

19. The method of claim 18, wherein:

in response to the first strand being looped from the first coil layer to the second coil layer, a strand adjacent to the first strand becomes a new outermost strand among the plurality of strands on the first coil layer; and in response to the second strand being looped from the second coil layer to the first coil layer, a strand adjacent to the second strand being looped becomes a new innermost strand among the plurality of strands on the second coil layer.

20. The method of claim 16, wherein:

looping the first strand from the first coil layer to the second coil layer comprises connecting a first portion of the first strand on the first coil layer to a second portion of the first strand on the second coil layer using a first set of contacts; and looping the second strand from the second coil layer to the first coil layer comprises connecting a first portion of the second strand on the first coil layer to a second portion of the second strand on the second coil layer using a second set of contacts.

* * * * *